United States Patent
Nicolle (10) Patent No.: US 7,325,229 B2
(45) Date of Patent: *Jan. 29, 2008

(54) METHOD FOR GRAPHICALLY VISUALIZING AN AUTOMATISM APPLICATION AND COMPUTER TERMINAL FOR CARRYING OUT SAID METHOD

(75) Inventor: Pascal Nicolle, Cagnes s/Mer (FR)

(73) Assignee: Schneider Automation, Valbonne (FR)

( * ) Notice: Subject to any disclaimer, the term of this patent is extended or adjusted under 35 U.S.C. 154(b) by 816 days.

This patent is subject to a terminal disclaimer.

(21) Appl. No.: 10/474,191

(22) PCT Filed: Apr. 15, 2002

(86) PCT No.: PCT/FR02/01300

§ 371 (c)(1),
(2), (4) Date: Oct. 16, 2003

(87) PCT Pub. No.: WO02/084480

PCT Pub. Date: Oct. 24, 2002

(65) Prior Publication Data

US 2004/0117773 A1    Jun. 17, 2004

(30) Foreign Application Priority Data

Apr. 17, 2001  (FR) .................................. 01 05218

(51) Int. Cl.
*G06F 9/45*    (2006.01)
*G06F 9/44*    (2006.01)
*G05B 15/00*   (2006.01)

(52) U.S. Cl. ...................... 717/136; 717/106; 717/108; 717/114; 717/115; 700/83; 700/86

(58) Field of Classification Search ..................... None
See application file for complete search history.

(56) References Cited

U.S. PATENT DOCUMENTS 5,267,145 A    11/1993  Zifferer (Continued)

FOREIGN PATENT DOCUMENTS

WO        95 23374        8/1995

(Continued)

OTHER PUBLICATIONS

Hammond, Tracy; Davis, Randall; "LADDER, a sketching language for user interface developers", p. 518-532, Computers & Graphics 29 (2005), retrieved from scholar.google.com search Feb. 22, 2007.*

(Continued)

*Primary Examiner*—Mary Steelman
(74) *Attorney, Agent, or Firm*—Oblon, Spivak, McClelland, Maier & Neustadt, P.C.

(57) ABSTRACT

A method of visualizing or graphically printing an automatism application programmed on a programming station with the aid of a graphic automatism languages on a computer terminal. The method includes storing a source program associated with an application program formulated in one of the graphic automatism languages on the terminal, the source program being translated into a single, hierarchical object oriented language (XML); and storing at least one style sheet associated with a graphic language on the computer in order to generate a graphic vector file containing drawing instructions enabling the automatism application to be displayed graphically on the terminal.

16 Claims, 4 Drawing Sheets

U.S. PATENT DOCUMENTS

| | | | |
|---|---|---|---|
| 5,455,952 A | 10/1995 | Gjovaag | |
| 6,507,857 B1* | 1/2003 | Yalcinalp | 715/513 |
| 6,519,617 B1* | 2/2003 | Wanderski et al. | 715/513 |
| 6,986,101 B2* | 1/2006 | Cooper et al. | 715/513 |
| 2002/0004804 A1* | 1/2002 | Muenzel | 707/513 |
| 2002/0129060 A1* | 9/2002 | Rollins et al. | 707/513 |
| 2003/0121000 A1* | 6/2003 | Cooper et al. | 715/513 |

FOREIGN PATENT DOCUMENTS

| | | |
|---|---|---|
| WO | 98 06033 | 2/1998 |

OTHER PUBLICATIONS

Gould, Michael; Ribaaygua, Antonio; SVG-Anew breed of web-enabled graphics:, p. 1-10, Geo World 1999, retrieved by scholar.google.com search Feb. 23, 2007.*

* cited by examiner

METHOD FOR GRAPHICALLY VISUALIZING AN AUTOMATISM APPLICATION AND COMPUTER TERMINAL FOR CARRYING OUT SAID METHOD

COMPUTER PROGRAM LISTING APPENDIX

A compact disk containing computer programs is associated with this application. The following appendices are found on the disk:

Appendix 1: DTD Description of the Grammar of the Ladder Language

Appendix 2: DTD Description of the Grammar of the SFC Language

Appendix 3: DTD Description of the Grammar of the FBD Language

Appendix 4: XML Source Program for an Application Formulated in Ladder Language

Appendix 5: XSL Stylesheet Defined for the Ladder Language

Appendix 6: SVG Display File for an Application in the Ladder Language

BACKGROUND OF THE INVENTION

1. Field of the Invention

This invention relates to a method for graphically displaying an automation application programmed on a programming station using graphic automation languages, on a computer terminal. The invention also relates to a computer terminal capable of graphically displaying an automation application programmed on a programming station using graphic automation languages.

2. Description of the Related Art

In the following, a programming station means a computer equipment, particularly a PC type personal computer, that can be connected to an automation equipment and on which software is installed for designing an automation application program using graphic automation languages.

In the following, an automation equipment means a programmable logic controller, an instrumentation/control station, a digital control or any equipment that can contain and execute an application program for controlling/monitoring an automation application. For example, this automation application may belong to the field of industrial automation, building automation or instrumentation/control of electrical distribution networks. This type of automation equipment can be composed of a central processing unit and one or several input/output couplers connected to sensors and preactuators of the industrial process to be controlled.

The central processing unit of an automation equipment comprises at least one processor, a non-volatile and usually non-modifiable memory (ROM type), or possibly a modifiable memory (EEPROM type), containing the manufacturer's program also called a proprietary operating system expressed in a language specific to the manufacturer of the automation equipment, a RAM memory and an inputs/outputs manager that communicate with each other through a back panel bus. The RAM or volatile memory contains the user program in a first area, and the data in a second area, particularly images of the states of input/output couplers and constants for the user's program.

The user program, also called the application program, is responsible for monitoring and/or controlling an automation application through inputs/outputs driven by this application program. It is generated by a designer and is written in one or several graphic automation languages, particularly including a Ladder diagram language, hereinafter referred to as the Ladder language, a Sequential Function Chart or grafcet language, hereinafter called the SFC language, a Function Block Description language, hereinafter called the FBD language, or in one or several automation text languages of the IL (Instruction List) or ST (Structured Text) type. These automation languages advantageously conform with the IEC1131-3 standard so as to facilitate programming by an automation designer who is not necessarily familiar with computer languages. These languages can be used on programming stations that may or may not be connected to the automation equipment to be programmed.

At the moment, automation applications created through the use of graphic automation languages according to the IEC1131-3 standard (Ladder, Grafcet, FBD, IL Instruction List, ST Structured Text) can only be displayed on a programming station on which the programming software for an application is installed. But this software is sometimes expensive and voluminous. Consequently, it cannot be installed on all computer terminals. Therefore, a technician using an automation application and who would like to be able to take action as soon as a malfunction on an automation equipment occurs, cannot graphically display his application program without making use of a programming station on which the programming software for the application is installed.

Therefore, the purpose of this invention is to overcome these disadvantages according to prior art by proposing a solution that in particular enables a technician to graphically display or to graphically print his application program from any computer terminal on which the installed software is not specific to the automation world.

This purpose is achieved by a method for graphically displaying or printing an automation application programmed on a programming station using graphic automation languages (LD, SFC, FBD), on a computer terminal comprising at least one processor and storage means. The method comprises:

a storage step on the terminal, to store a source program of an automation application formulated using a graphic automation language (LD, SFC, FBD), the source program being written in a unique hierarchised and object oriented language representing at least one graphic automation language (LD, SFC, FBD), a storage step on the terminal to store at least one stylesheet associated with the graphic language used for development of the automation application, a processing step to process the source program on the terminal using the stylesheet to generate a graphic vector file containing directives of graphic vector drawing to enable graphic display of the automation application on the terminal, or to print it graphically.

SUMMARY OF THE INVENTION

According to one feature, the source program used in the source program storage step describes an automation application in the graphic Ladder language LD, defining the different elements of the Ladder language (particularly contact, horizontal link, vertical link, coil, short circuit, empty cell, function block call, FFB expression, comparison block, arithmetic operations block) like software objects organised as a tree structure and stored in the memory of the station or the automation equipment, these objects having attributes in the form of objects, parameters (for example position type parameters), variables or texts.

According to another special feature, the source program used in the source program storage step describes an automation application in the graphic SFC language defining the different elements of the SFC language (namely in particular step, transition, jump, link between graphs, comment) like software objects organised as a tree structure and stored in the memory of the station or the automation equipment, these objects having attributes in the form of objects, parameters (for example position type parameters defining position coordinates of the corresponding object in the grid of rows and columns representing the graphic of the object), variables or texts.

According to another feature, the source program used in the source program storage step describes an automation application in the FBD graphic language defining the different elements of the FBD language (namely in particular function blocks, text boxes, links between blocks, jump instructions, labels, comments) as software objects organised as a tree structure and stored in the memory of the station or the automation equipment, these objects having attributes in the form of objects, parameters, variables or texts.

According to another characteristic, the stylesheet used in the step for storage of the stylesheet and in the step for processing the source program, contains rules, each rule corresponding to an element in the graphic automation language, the source program processing step including a step to activate the rule corresponding to an element found in the source program, this activation producing one or several graphic instructions in the generated graphic vector file.

According to another feature, the method comprises a prior step for translation of the source program into a single, hierarchised and object oriented language representing at least one graphic automation language, produced on an automation application programming station. The step to translate the source program into a single, hierarchised and object oriented language representing at least one of the graphic automation languages is done on the programming station using a graphic automation language description grammar written in the same single, hierarchised and object oriented language. According to one characteristic, the single, hierarchised and object oriented language is XML (eXtended Markup Language).

According to another special feature, the stylesheet used in the step for storage of the stylesheet and in the step for processing of the source program, is an XSL (Extensible Stylesheet Language) stylesheet defined for each graphic language used for the development of an automation application.

According to another feature, the URL address of the stylesheet is stored in the source program in the XML language and the stylesheet is downloaded through the network when the source program is processed by the computer terminal. The URL address of the stylesheet used in the stylesheet storage step and in the source program processing step, may be stored in the source program in the XML language and the stylesheet may be downloaded through the network at the time that the computer terminal processes the source program.

Another purpose of the invention is to propose a computer terminal that can implement this process.

This other purpose is achieved using a computer terminal comprising at least one processor and storage means, for graphically displaying or printing an automation application programmed on a programming station using graphic automation languages. The computer terminal comprises:

means of using a stylesheet to process a source program for an automation application programmed on a programming station using graphic automation languages, the source program being translated into a single, hierarchised, object oriented language representing at least one graphic automation language, means of generating a graphic vector file containing graphic vector drawing directives, as a function of the processing done by the processing means, means of displaying the graphic vector file on the terminal, to display or graphically print the automation application program.

According to one feature, the graphic means are composed of a software editor supporting the SVG (Scalable Vector Graphics) format belonging to the W3C (World Wide Web Consortium). The software editor may be provided with an interpreter, in other words an executable application, to graphically display documents in the SVG format.

According to another feature, the processing means comprise an XSLT (Extensible Stylesheet Language Transformation) processor to generate the graphic vector file by processing the source program using the stylesheet.

According to another feature, the terminal comprises printing means directly supporting the SVG standard as the print format. The terminal may comprise means of downloading a stylesheet adapted to the graphic language adopted for the development of the automation application.

According to another feature, the single, hierarchised and object oriented language is the XML (eXtended Markup Language).

DESCRIPTION OF THE DRAWINGS

The characteristics and advantages of the invention will become clear after reading the description made with reference to the attached drawings in which.

The description also includes the following appendices located on a compact disc filed with the USPTO and incorporated herein by reference:

appendices 1 to 3 contain examples of grammars specific to the translation of the Ladder, SFC and FBD graphic languages respectively, in a file with a "Document Type Definition" (".dtd") format, appendix 4 shows an example of a source program of an application in Ladder graphic language written using a grammar described in appendix 1, appendix 5 contains an example of an XSL stylesheet defined for the Ladder graphic language, and appendix 6 defines an example of an SVG text file generated by application of the XSL sheet in appendix 5 onto the source program visible in appendix 4.

DETAILED DESCRIPTION OF THE INVENTION

The invention consists of producing a file containing drawing directives that can be used on any computer terminal comprising at least one processor, storage means and on which appropriate software is installed, to graphically reproduce an automation application input by an automation application designer on a programming station using a graphic automation language such as those conform with standard IEC1131-3, referred to as the Ladder (LD) language, the FBD (Function Block Description) language or the SFC (Sequential Flow Chart) language.

Generating this file in a specific format enables an automation application programmed in one of these graphic languages (LD, SFC, FBD) to be displayed in graphic form, starting from the source program translated into a single, hierarchised and object oriented language representing the application written in one of the graphic automation languages (LD, SFC, FBD). In this embodiment, the single, hierarchised and object oriented language used is the XML (eXtended Markup Language). The source program translated in the XML universal language based on hierarchised objects or elements is obtained by describing the automation application starting from a grammar written in this XML language. The grammar is specific to the translation of the automation application formulated in one of the graphic automation languages (LD, SFC, FBD) into the XML language. The description is text only (no binary information), it is independent of the implementation and it must respect XML standards. The source program may be stored partly or fully in the form of files. These files may be exported to or imported from third party software. The XML source program is composed of a tree of elements. Each element is composed of an opening tag with the element name, the contents or value of the element, and a closing tag. Opening and closing tags are words surrounded by the "less than" (<) and "greater than" (>) signs. In an opening tag, the element name may be followed by one or several attributes that describe some properties of the element. Each attribute is a name="value" pair. Thus, the automation application is fully described using elements and attributes.

A grammar specific to the translation of an application written in the Ladder graphic language into the XML language is defined in appendix 1. An application source program, written in the Ladder language and translated from this specific grammar, is defined in appendix 4.

The description in the Ladder language is structured in contact networks; each network is described line by line from top to bottom. Each line is described from left to right. Each line begins at the left rail (at the left of the view of the Ladder contact network) and finishes on the last graphic element described. Each line contains a list of standard graphic elements (contacts, coils, horizontal link, vertical link, function block, etc.) of the relay language. Graphic coordinates are related to the position of objects in the grid of rows and columns representing a graphic.

In appendix 1, the position of the element or the object with respect to the beginning of the line is offset to represent the hierarchic dependence of the object. Line 10 in the grammar shown in appendix 1 corresponding to a graphic representation of an application in the Ladder language defines that an "LDSource" application in the Ladder language is composed of a Ladder network (networkLD) and from zero to n (indicated by *) text boxes (textBox). A Ladder network (networkLD) is composed of one or several type lines (typeLine) (indicated by the + sign) and a link with zero to n function blocks (FBLink). The link with at least one function block (FBLink) is composed of two position objects with coordinates (objPosition) that define a start position corresponding to the "from" attribute (from, line 51) and an end position corresponding to the "to" attribute (to, line 52), as shown on line 50 in appendix 1. As indicated in line 13 in appendix 1, the type line (typeLine) object is composed of between zero and n of a combination of the following objects—either an empty line (emptyLine), or a choice among a contact (contact), a horizontal link (Hlink), a vertical link (Vlink), a coil (coil), a control (control), a short circuit (shortCircuit), an empty cell (emptyCell), a function block call (calls), an FFB expression (FFBExpression), a comparison block (compareBlock) and an arithmetical operation block (operateBlock). The type line (typeLine) object has a label attribute that is text. The contact object that is defined in line 18 has the contact type as attribute that defines the contact type (open, closed, rising, falling in enumeration form (openContact, closedContact, Pcontact, Ncontact) and the name of the contact variable (ContactVariableName) which is of the text type. Line 23 defines the horizontal link (HLink) object that has a number of cells (numberCell) through which the horizontal link (HLink) passes as an attribute. Lines 26 and 27 in appendix 1 define the coil (Coil) object that may be a direct coil (Coil) type, or an inverse coil (notCoil), a set coil setting to one (setCoil), a reset coil setting to zero (resetCoil), a transition change coil (hashCoil) used in association with SFC language, a rising front coil (Pcoil), a falling front coil (Ncoil) and the coil variable name (coilVariableName) which is of the text type. The control object (control) on lines 35 to 37 defines the control type as either jump (jumpCoil) or return (retCoil). The short circuit (shortCircuit) object is defined on line 38 as being the combination of vertical link (Vlink) objects with a choice of one of the following elements: horizontal link (Hlink), contact (contact), coil (coil), calls (calls), comparison block (compareBlock). A call block (calls) like that defined in line 39, contains an object instance (instanceObj), a parameter type (typeparam) and a call description (descriptionCall). The parameter type (typeParam) and the call description (descriptionCall) may have different values as indicated by the question mark ("?"). The value of the parameter type is defined on line 41 as being equal to the Boolean value "0" or "1" (enEnO). Line 43 defines the description of a call (descriptionCall) as being composed of a list of inputs (inputListFBD) to a function block (FBD) that are lists of formal parameters and effective parameters (see lines 45 and 46) and a list of outputs (outputListFBD) from a function block (FBD). Text boxes are defined by the position of the text box object and by its height and width dimensions.

Sections of each application program written in Ladder may be described using the grammar corresponding to the Ladder graphic language. Each grammar is used to define a hierarchy between objects and to represent an application in the form of a graphic tree structure (30) in the RAM memory of the programming station.

As can be seen in appendix 1, the root of the tree is composed of the source application (LDSource) to which one or several sons are attached, that are the network (networkLD) and possibly one or several text boxes (textBox). The network has one or several sons composed of line type (typeLine) objects and function block link (FBLink) type objects. The object of the line type (typeLine) object is an empty line (emptyLine) or one of the following elements: contact (contact), vertical link (VLink), horizontal link (HLink), coil (coil), control (control), short circuit (short- Circuit), calls (calls), FFB expression (FFBExpression), block comparison (compareBlock), block execution (operateBlock).

Appendix 2 contains the definition of a grammar specific to translation of the description of an application in the SFC graphic language into the XML language.

The description of an application (SFCSource) in the SFC language comprises a header (SFCHeader) and is structured in pages (SFCPage) corresponding to screen pages displayed by the SFC language editor. The attributes of the header (SFCHeader) are the task (task) and graph name (graphName). Each page may contain one or several SFC networks (networkSFC). Each network contains a list of "object" elements chosen from among the following standard graphic elements in the SFC language: steps (step), jumps (jump), transitions (transition), links between step and transition (SFCLinkObject), comments (commentSFC), links between graphs (linkSFC). The graphic coordinates of the different jump, step or transition type objects are defined by a position type object (objPosition) defining the position of the corresponding object (jump, step or transition) in the row/column grid. A step type object is defined by one or several actions, for which the attributes are defined in lines 23 and 24 in appendix 2. The transitions are also defined by transition conditions (transitionCondition). Link type objects between graphs (linkSFC) are composed of two position objects (objPosition) with coordinates defining a start position corresponding to the "from an object type" attribute (typeObjectFrom) and an end position corresponding to the "to an object type" (typeObjectTo) attribute. Each of these two attributes is chosen from among one of the following objects: initial step (initialStep), step (step), macro step (macoStep), internal step (stepIn), transition (transition), A branch (Abranch), P branch (Pbranch), A joint (Ajoint), P joint (Pjoint) and for the "to" attribute, also from among one of the previous objects and the jump object (jump).

The hierarchy of the SFC language is as follows. The root of the tree structure is the source object (SFCSource) for which the sons are the header (SFCHeader) and the page (SFCPage). The son of the page is the network (networkSFC), and the sons of the network are the step, jump, transition, FSC object link (SFCLinkObject), the SFC comment (CommentSFC) and the link between SFC graphs (linkSFC).

Similarly, appendix 3 defines a grammar specific to the translation of a description of an application in the FBD language into the XML language.

Each network in the FBD language contains a list of standard graphic elements in the FBD language: function block (FFBBlock), text box (textBoxFBD), label (labelObject), comments (commentObjectFBD), link between blocks (linkFBD) and the jump instruction jumpObject). Each element is defined in accordance with lines 12 to 38 in appendix 3. The graphic coordinates are related to the position of objects in the row/column grid.

The hierarchy between objects defined in this grammar is as follows; The root is composed of the FBD source (FBDSource) which is composed of one or several FBD networks (networkFBD), and each network is composed of one or several son elements among the block (FFBBlock), text box (textBoxFBD), label (labelObject), jump (jumpObject), comment (commentObjectFBD), and link (linkFBD).

Figure 2:
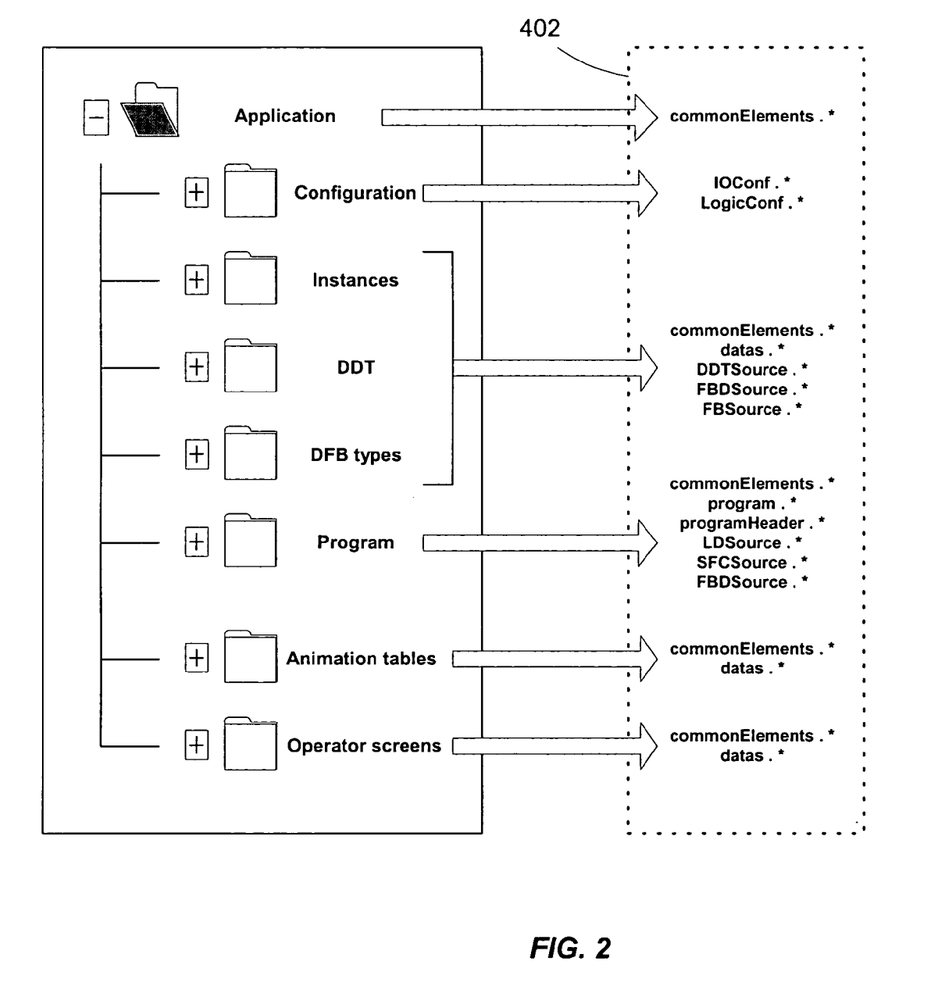
FIG. 2 shows a diagrammatic view of the memory organisation of the grammar describing an automation application in the single language according to the invention.

Grammar description files (402, FIG. 2) are organised as follows. An automation application may be decomposed into three main parts—its program, its data and its inputs/outputs. The grammar of each of these parts according to the invention is described in a "Document Type Definition" file in the ".dtd" format (for example program.dtd for the application program file, datas.dtd for the data file, lOConf.dtd for the inputs/outputs configuration file) or in an equivalent manner in a "Schema" file in the ".xsd" format. In the remainder of the description, we will refer to ".dtd" files, but they could be replaced by "Schema" files in the ".xsd" format in an equivalent manner. Thus, the "data.*" type notation is used to refer to a data file that may be of the "data.dtd" or "data.xsd" type. Each of the application parts may itself be broken down into sub-parts themselves defined in a ".dtd" (or ".xsd") description file. For example, the program file (program.dtd) may include source files (LDSource.dtd, SFCSource.dtd and FBDSource.dtd, as shown in FIG. 2) that contain grammars of different Ladder type graphic languages or ladder diagrams (LD), sequence function charts (SFC) and function block diagrams (FBD).

".dtd" or ".xsd" (402) files are specific to the manufacturer and contain the description of the different grammars. Thus, the "Application" folder (FIG. 2) comprises the (commonElements.*) file that contains elements common to the automation application, namely the application name, the application or version production date, the version number and comments. The "Configuration" file contains input/output (lOConf.*) and logical configuration (LogicConf.*) files. The "Instance", "DDT" (Derived Data Type—data types derived from elementary types) and "DFB types" folders contain the description of instance, DDT, DFB type data respectively in the form of files (data, DDTSource.*, FBDSource.*, FBSource.*). The "Program" folder contains source files (LDSource.*, SFCSource.* and FBDSource.*) that contain the description of each grammar for each usual graphic representation used in automation described in appendices 1 to 3 respectively. The "Animation tables" folder contains the description of animation tables, composed partly of the (commonElements.* and data.*) files. The "Operator screens" folder contains descriptions of operation screens composed of files of common elements (commonElements.*) and file data (data.*).

Figure 3:
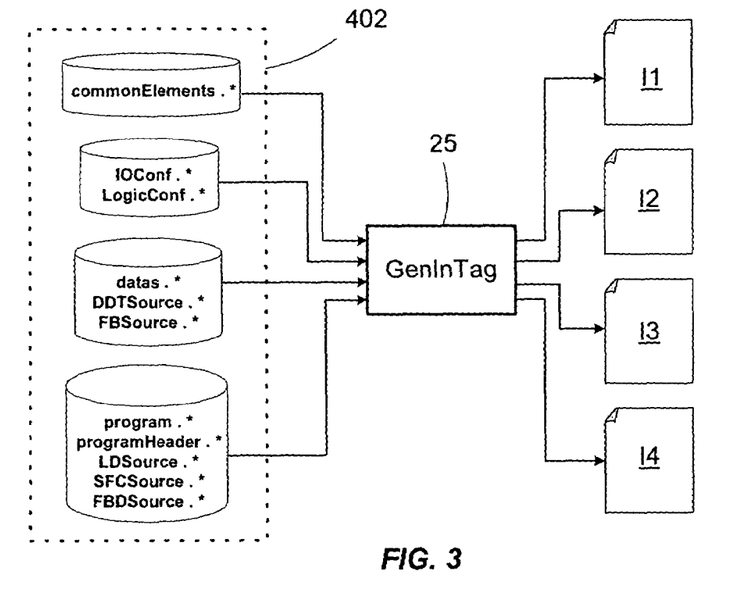
FIG. 3 shows a software component that forms a tag index generator to produce an index file.

These various grammar files (402) define the structure of XML files. An XML file of an application represents an instance of the grammar defined in the corresponding ".dtd" (or ".xsd") file. XML files (401, FIG. 3) are specific to the automation application considered. The principle of the correspondence between these two file types is defined by the XML V1.0 standard in accordance with the document object model (DOM). The document object model (DOM) is a set of standard programming functions (API—Application Programming Interface) to manipulate XML files.

The correspondence between the XML files and the application databases is as follows:

An automation application is stored in binary in a memory of a programming station. This automation application according to prior art was developed by the user using an editor (5) for graphic languages IEC1131-3, using a software component subsequently called the manager (Mng1, Mng2, etc.) to store user inputs, in several databases, for example one database (Db1) for the program, one database (Db2) for application data and one database (Db3) for configuration of the application inputs/outputs, (Db1) and (Db2) being shown in FIG. 1. The description of the application in XML language according to the invention is completely independent of its implementation in manufacturer databases. A particular software component has been developed to achieve this independence, composed of an automatic (Tag) index generator shown in FIG. 3, and called the GeninTag (25) component in the following.

The GeninTag (25) software component generating tag indexes must be executed to produce index files (".h") to create the correspondence between the XML graphic tree structure (30) representative of the automation application in the language according to the invention and the database structures (Db1, Db2). More particularly, an index file makes the correspondence between the nodes of the tree structure produced by execution of files in the single language XML, and objects associated with graphic automation description languages that are stored in databases. This GenInTag component extracts keywords (elements, objects and attributes) from the different ".dtd" grammar files (402) that define XML grammars for the program, data, and the input/output configuration index in the XML language, in order to generate indexes organised in several files, for example four files (I1, I2, I3, I4) in FIG. 3, each containing one or several index constant files used by the different managers (Mng1, Mng2, etc.) managing an application.

The GenInTag component reads the document type definition files ".dtd"—or the schema definition ".xsd"—and generates the different index files. The embodiment presented includes index files (I1) for the definition of keywords for the hardware and software configuration (SrcTaglOConf.h, SrcTagLogicConf.h), index files (I2) for the definition of data keywords and data types grouped in the (SrcTagDatas.h, SrcTagDDTSource.h, SrcTagFBSource.h) files, index files (I3) for the definition of the keywords for the program (SrcTagProgram.h, SrcTagProgramHeader.h, SrcTagSFCSource.h, ScrTagLDSource.h, ScrTagFBDSource.h), and index files (I4) for the definition of keywords common to the other parts of the application (SrcTagCommonElements.h). These index files form the correspondence necessary to use application description databases (Db1, Db2, etc.) according to prior art. They are stored in a non-volatile memory of the programming station.

Figure 1:
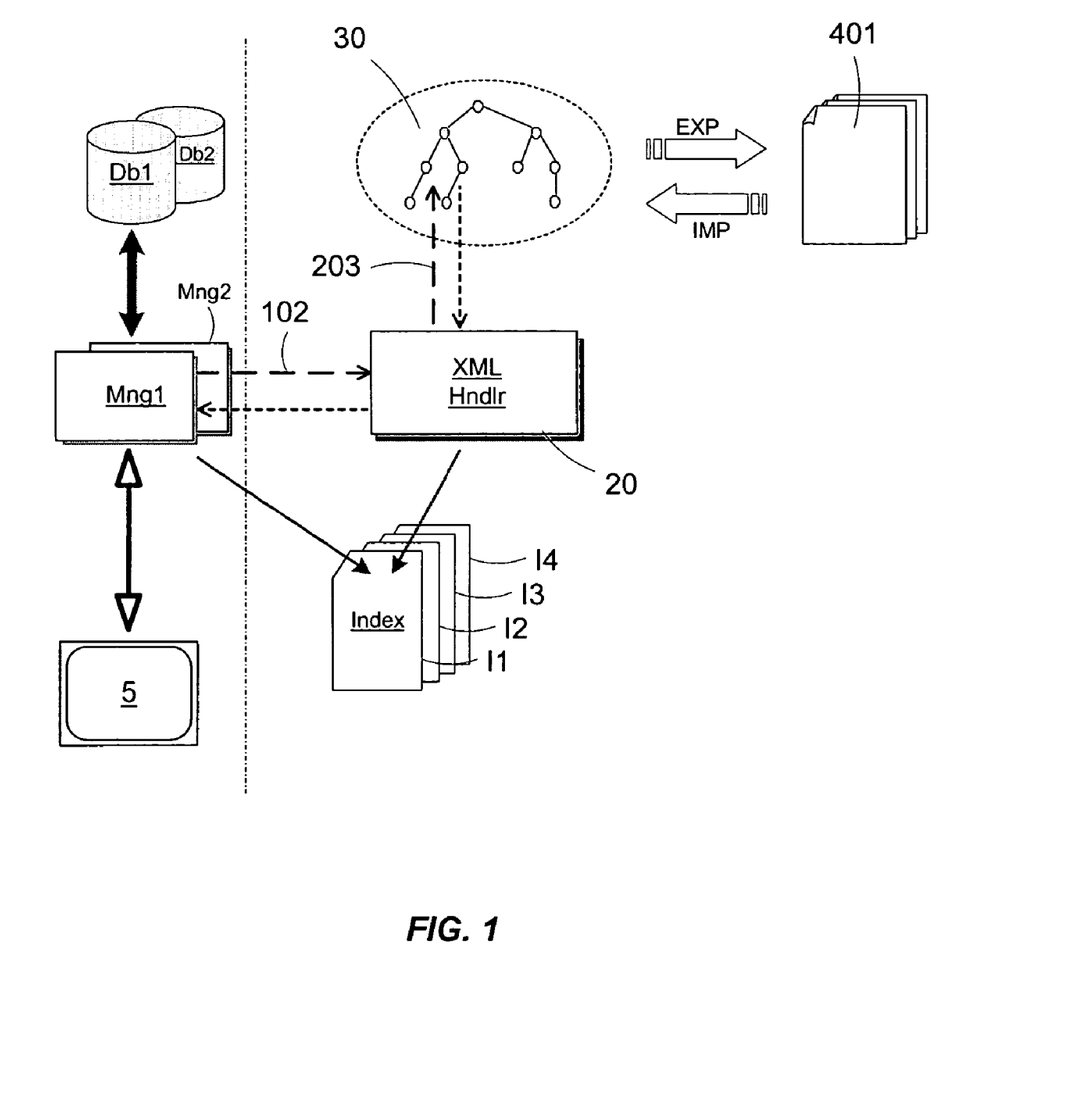
FIG. 1 shows a diagrammatic view of a programming station on which an XML manager is installed to import or export single language application files to one of the graphic languages.
Figure 4:
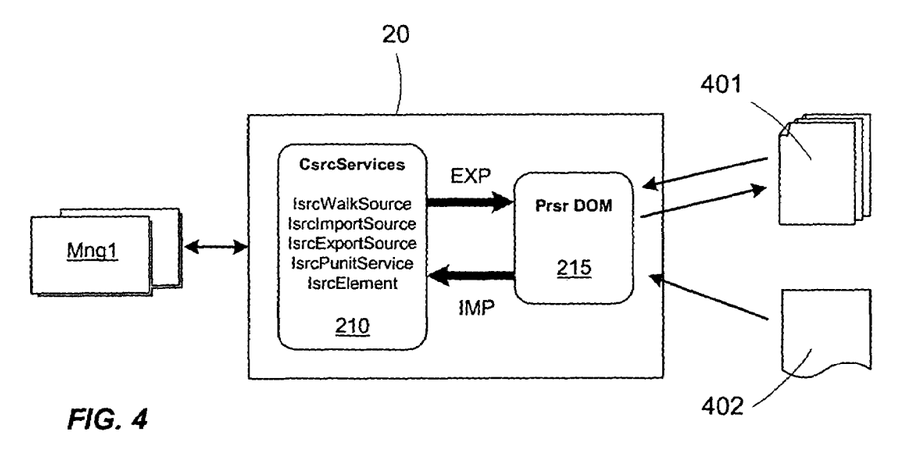
FIG. 4 shows a diagrammatic view of component modules of an XML handler Hndlr for importing and exporting files from one language to another.

The programming station incorporates an XML Handler Hndlr (20) in a non-volatile memory. The XML Handler Hndlr (20) manager is a software component developed in the C++ language that can be used through a COM interface. It encapsulates and uses the services of a Parser DOM Prsr (215) and offers high level services for management of the XML graphic tree structure (30). The XML Handler Hndlr (20), shown in more detail in FIG. 4 is used to create the tree structure (30) representative of the application from the description files (401) using the grammar files (402) or to make this tree structure following requests from application database managers (Mng1, Mng2, etc.). It uses the various managers that call the services of the XML Handler Hndlr (20) using index files (I1 to I4) generated by the GenInTag component (25). As shown in FIG. 1, each part of an application, for example the application program (Db1), application data (Db2), is managed by a specific manager (for example Mng1 for the application program, Mng2 for the data). The XML Handler Hndlr (20) comprises an export routine (EXP) and an import routine (IMP), in addition to the Parser DOM Prsr that is a software component in the C++ language.

All that is useful for the purposes of this invention is the export routine. The export routine writes automation application data into an XML file, while the import routine reads data from the automation application in an XML file. These routines call the module service (210) (CsrcServices) that is itself composed of several services. One service (IscrWalkSource) is used for moving about in the model file (401) in the XML language loaded in memory. The (CsrcServices) component also comprises a service (IsrcimportSource) that initialises an XML file (401) in read, the service (IsrcexportSource) that writes XML files and the component (IsrcPUnitService) that manages services specific to the programming station. The XML handler Hndlr (20) also comprises a service (IsrcPUnitService) that manages services specific to the programming unit. Finally, the handler (20) comprises a service (IsrcElement) that is a service providing access to the contents of XML data (elements and attributes). Each manager dialogues with the different services of the handler (20). The specific managers (Mng1, Mng2, etc.) use index files (I1 to I4) generated by the GenInTag component (25) corresponding to the data in the database.

The application stored on the programming station in a set of one or several XML description files (401) is modelled by the XML handler Hndir (20) in the form of a tree structure (30) using firstly information distributed in the programming station memory in databases (Db1, Db2, etc.) and in the form of binary files, and secondly the indexes (I1 to I4) created by the GenInTag component (25) to access this information and to represent it in tree structure form. As shown in FIG. 1, the XML handler Hndlr (20) uses notifications to communicate with the managers (Mng1, Mng2, etc.) of databases (Db1, Db2, etc.) and with the application tree structure management module.

Thus, during an export, a manager (Mng1) can send a notification (102) "CreateNode (index, value)" requesting the XML handler Hndlr (20) to create a node with a determined index and a determined value. The handler (20) uses index values and read source files (401) and grammar files (402), to ask the tree structure management module to use a "Create Node (tagname, value)" notification (203) to create a node with the tag name equal to the name defined by "tagname" and with a value denoted by "value". Developing these grammars in the XML language and writing the files is a means of developing an interpreter on an automation equipment, this interpreter module being an executable program with the function of translating instructions describing an application formulated in the XML language, into instructions that can be executed by the operating system of the automation equipment. In this manner, the result is automation equipment in which the programming language would be accessible to any editor available on a PC type machine and would thus enable the automation designer to develop application programs for which the files would be stored in the ASCII format.

The graphic languages can thus be described in ASCII in a normalised manner. This normalisation of a grammar enables the exchange of automation application programs between software (operating systems) produced by different manufacturers.

Figure 5:
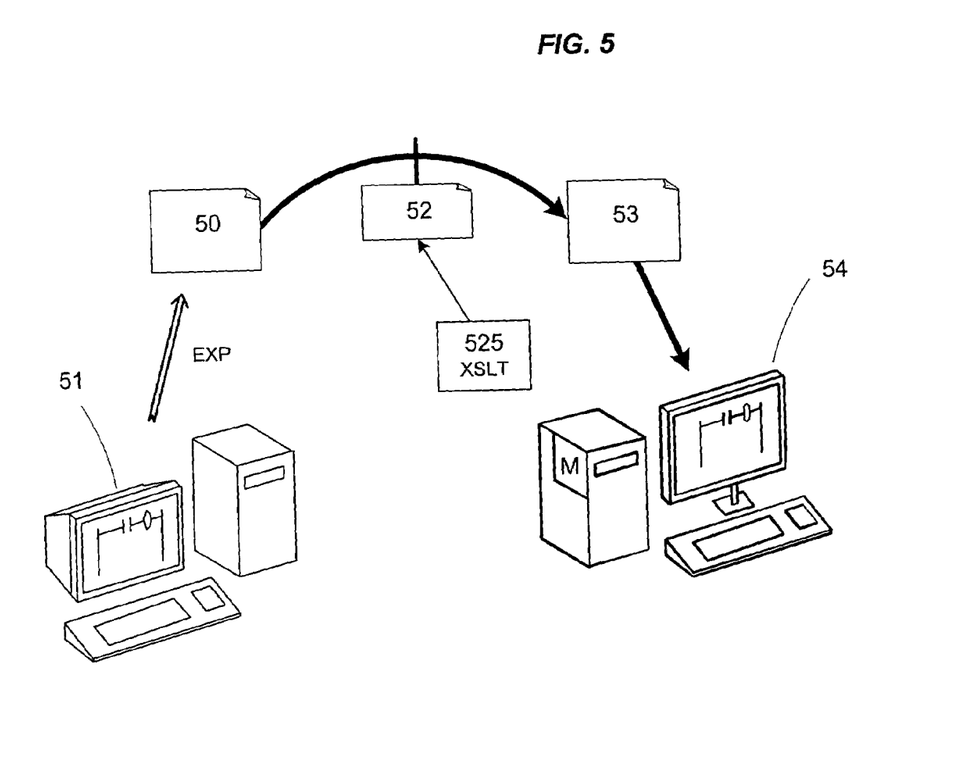
FIG. 5 shows a diagrammatic view of the main phases of the method according to the invention.

The procedure according to the invention is shown in FIG. 5. Once an XML source program (50) of an automation application program programmed on a programming station (51) has been produced according to the description given above, it may be stored in a memory (M) of any computer terminal (54) and displayed in text using a text editor on this terminal (54). An XML source program (50) of an automation application written in the Ladder language is given in appendix 4. This source program (50) calls an XSL stylesheet (Extensible Stylesheet Language) on line 6, with the URL address "d:\xml\presentation\tp\LDtoSVG3.xsl".

According to the invention, an XSL stylesheet (52) is created to be applied to the XML source program (50) of an automation application formulated starting from one of the graphic automation languages such as those in standard IEC1131-3 (LD, SFC, FBD), in order to produce a graphic vector file (53) in the SVG (Scalable Vector Graphics)

format and to display it on a terminal (54) on which an editor software is installed that supports the SVG format, with the components necessary to understand the XML language. For example, this editor software could be an Internet browser such as "Microsoft Internet Explorer". The XSL stylesheet (52) is unique for each graphic automation language. Thus, there is a separate stylesheet for the Ladder language, for the SFC language and for the FBD language.

In order to produce the file (53) in the SVG format and thus be able to display the automation application in graphic form on the terminal editor (54), the XSL stylesheet (52) corresponding to the graphic automation language in which the automation application was originally formulated, must be applied to the source program. Thus, according to the invention, it would be possible to graphically display an automation application formulated in a graphic automation language without using its programming station (51). All that is necessary is to retrieve the XML source program (50) of this application and to apply an XSL sheet (52) specific to the graphic automation language used to program the automation application to it, to obtain a file (53) in the SVG format. This file (53) in the SVG format reproduces drawing directives necessary to graphically display the automation application as represented in FIG. 5, on any computer terminal (54).

An XSL stylesheet (52) is written in XML and is structured in an elements tree. An XSL stylesheet (52) comprises a set of rules and structures defined by the stylesheet, and that will be applied to the source program. A selector associated with each rule is responsible for activating the rule when a given type of an element is found in the source program.

The XSL stylesheet (52) defined for the Ladder language is shown in appendix 5. The text SVG file (53) derived from application of this XSL sheet (52) onto the source program (50) shown in appendix 4, is defined in appendix 6. The presentation of the XSL sheet (appendix 5) is as follows. The "xsl" expression is repeated in front of all elements such that when the XSL stylesheet (52) is applied to the source program (50), the editor understands the instruction using the XSL language and not another language. The XSL stylesheet (52) is written respecting a predefined structure, in a ".dtd" file defined after the "DOCTYPE" instruction and with the name "svg-20000303-stylable.dtd". The first lines in the XSL stylesheet (52) apply to the search for the root element defined by "/" ("template match='/'") in the source program. The XSL stylesheet (52) then understands line 46 as a "currentposx" search instruction in the source program (50). Once found, the selector will activate a number of rules in the generated SVG file (53). This can be seen particularly clearly starting from page 25, line 8 in appendix 5, in the stylesheet (52). The <xsl:template match="networkLD"> instruction means that when the "networkLD" element is found in the source program (50), the rules defined starting from line 9, page 25 in appendix 5 and in particular including "<linestyle="stroke:#000000, etc." are activated. Since the "networkLD" element is located in the source program (appendix 4) in line 16, page 22, the rules are applied. These rules defined in the stylesheet (appendix 5), also appear in appendix 6, on page 29 lines 7 to 13. This stylesheet (52) specific to the Ladder language defines the search for the different "contact" type elements in the source program (50), on line 28, page 25 to line 32, page 26. These contacts may be of different types along the graphic showing the automation application. They may be open ("openContact"), closed ("closedContact"), of the rising type "P" ("PContact"), or of the falling type "N" ("NContact"). When one of these contact types is found in the source program (50), the selector applies certain rules. These rules include graphic instructions necessary to draw these contacts so that when the automation application is displayed directly on the programming station (51), they are represented as shown in FIG. 5. The format of these instructions is "<line style="stroke:=000000;stroke-width:1; etc." type. The source program (appendix 4) comprises "openContact" (lines 19, 31), "closedContact" (lines 22, 39), "PContact" (line 28) and "NContact" (line 37) type elements. Therefore, the rules are activated as a function of the position of the elements in the source program (50) and are located in the SVG file (53), for example, on page 29, lines 14-23 for the "openContact" element, on page 29, lines 28-37 for the "closedContact" element, on page 29, line 59 on page 30, line 6 for the "PContact" element and on page 30, lines 44-53 for the "NContact" element.

The XSL stylesheet (appendix 5) also defines all rules necessary to draw the different types of coils ("Coil"). There are different types of coils in the Ladder language, "setCoil" (page 27, lines 5-20), "resetCoil" (page 27, lines 21-36), "PCoil" (page 27, lines 37-52), "NCoil" (page 27, line 53-page 28, line 4). Different coil types are located in the source program in appendix 4 and therefore in the automation application. "PCoil" type coils are shown on lines 32 and 53, and "setCoil" coils are shown on line 41, "resetCoil" type on line 47, and "Ncoil" type on line 60 in the source program (50). Therefore the rules corresponding to these discoveries in the source program are reproduced from the XSL stylesheet in the SVG file. For example, these rules may be "<line style="stroke:#000000; stroke-width:1; stroke-opacity:1, etc." (appendix 6, page 30, line 24). Note also that for the "P" type coil ("PCoil"), instructions of the "<circle style="stroke:#000000; stroke-width:1; etc." type appear in the stylesheet and therefore in the SVG file (appendix 6, page 30, line 27).

Once the XSL stylesheet (52) has been created, the XML source program (50) contains a code line (appendix 4, line 6) containing an instruction to call the XSL stylesheet (52) corresponding to the graphic language (LD, SFC, FBD) of the automation application from which the source program (50) is derived.

Opening the XML source program (50) that includes this instruction using an editing software such as an Internet browser causes this code line to call the XSL stylesheet (52), that will automatically be applied to the XML source program (50) as described above. This application produces the SVG file (53) directly containing graphic instructions for the graphic display of the automation application on the screen of the computer terminal (54). Using the XSL stylesheet (52), the display in SVG format on the computer terminal (54) will precisely correspond to the display of the automation application on its programming station (51).

This display on the terminal (54) comprising the editor software is allowed if it comprises an XSLT (Extensible Stylesheet Language Transformation) processor (525). The Internet Explorer software and other Internet browsers use this processor type (525). The XSLT processor (525) enables the editor to understand the XML language and to apply the XSL sheet onto the XML source program when it is open on the editor. However, the graphic display from the editor software and therefore the interpretation of instructions in the SVG file will be allowed if the editor software also has an SVG interpreter. For example, at the moment Internet Explorer requires the additional installation of a "plug-in" to graphically display SVG documents. If the editor does not include the "plug-in", it will display the source program (50) in text only.

Therefore according to the invention, it will be possible to graphically display an automation application without needing to use the application programming station (51). Therefore, the automation application can be graphically displayed on any computer terminal (54) comprising an editor supporting the SVG format, for example such as an Internet browser. This may be useful particularly for maintenance operations, in order to produce a malfunction diagnostic. In this case, it will not longer be necessary to use an automation application programming station, all that will be necessary is the XML source program. The XSL stylesheet (52) will be applied to the XML source program (50) directly on a computer terminal (54) after using an Internet or Intranet type network to download the XSL stylesheet (52) to apply it to the XML source program (50) that can be displayed in text form, in order to obtain a source program that can be displayed in graphic form. According to the invention, it will also be possible to graphically print the automation application. Some printers will support the SVG standard directly as the print format.

It should be obvious to persons skilled in the subject that this invention enables embodiments in many other specific forms without going outside the scope of the invention as claimed. Consequently, these embodiments must be considered as illustrations only, but they can be modified within the scope defined by the attached claims, and the invention must not be limited to the details given above.

The invention claimed is:

1. A method for graphically displaying or printing on a computer terminal, including at least one processor and a storage device, an automation application, comprising the steps of:
    storing on the computer terminal a source program of an automation application formulated using a graphic automation language, the source program being written in a hieracrchal, object oriented language representing the graphic automation language;
    storing on the computer terminal at least one Extensible Style Language (XSL) stylesheet associated with the graphic automation language; and
    processing the source program on the computer terminal using the XSL stylesheet to generate a graphic vector file containing directives of a graphic vector drawing to enable a graphic display of the automation application on the computer terminal or to print graphically the automation application.

2. The method according to claim 1, wherein the source program, describes the automation application in a graphic Ladder language having different elements of the graphic Ladder language defined as software objects organized as a tree structure and stored in a memory of a programming station or an automation device, the software objects having attributes in a form of objects, parameters, variables, or texts.

3. The method according to claim 1, wherein the source program, describes the automation application in a graphic Sequential Function Chart (SFC) language different elements of the SFC language defined as software objects organized as a tree structure and stored in a memory of the programming station or an automation device, the software objects having attributes in a form of objects, parameters, variables, or texts.

4. The method according to claim 1, wherein the source program, describes automation application in Function Block Description (FBD) graphic language defining different elements of the FBD language as software objects organized as a tree structure and stored in a memory of the programming station or an automation device, the objects having attributes in a form of objects, parameters, variables, or texts.

5. The method as claimed in claim 1, wherein the XSL stylesheet, contains rules, the step of processing the source program including a step of activating a rule corresponding to an element of the graphic automation language the step of activating producing one or plural graphic instructions in the generated graphic vector file.

6. The method as claimed in claim 1, further comprising translating the source program into a second hierarchal, object oriented language.

7. The method according to claim 6, wherein the step of translating of the source program is done on a programming station using a graphic automation language description grammar written in the second hierarchal, object oriented language.

8. The method as claimed in claim 6, wherein the second hierarchal, object oriented language is Extensible Mark-up Language (XML) language.

9. The method according to claim 1, wherein a Uniform Resource Locator (URL) address of the XSL stylesheet stored in the source program in the Extensible Mark-up Language (XML) language and the XSL stylesheet is downloaded through a network at a time that the computer terminal processes the source program.

10. A system, including at least one processor and a storage device, for graphically displaying or printing an automation application comprising:
    means for using Extensible Style Language (XSL) stylesheet, for processing a source program for an automation application programmed using a graphic automation language, including means for translating the source program into a hierarchal, object oriented language representing the graphic automation language,
    means for generating a graphic vector file, with said XSL stylesheet, containing graphic vector drawing directives;
    means for displaying the graphic vector file, including means for graphically displaying or printing the automation application program.

11. The system according to claim 10, wherein the means for generating a graphic vector file comprises a software editor supporting a Scalable Vector Graphics (SVG) format.

12. The system according to claim 11, wherein the software editor includes an interpreter configured to graphically display documents in the SVG format.

13. The system as claimed in claim 11, further comprising means for printing SVG formatted material.

14. The system as claimed in claim 10, wherein the means for processing comprises an Extensible Style Language Transformation (XSLT) processor configured to generate the graphic vector file by processing the source program using the XSL stylesheet.

15. The system as claimed in claim 10, further comprising means for downloading the Extensible Style Language (XSL) stylesheet.

16. The system as claimed in claim 10, wherein the single, hierarchized and object oriented language is Extensible Mark-up Language (XML) language.

* * * * *